Figure 1:
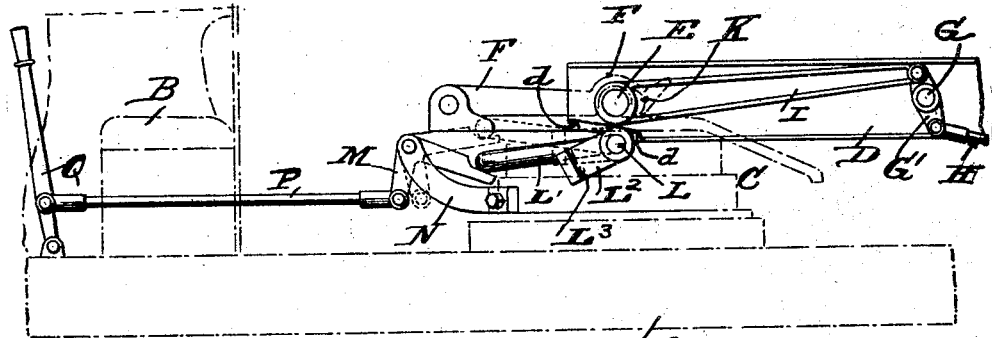

Oct. 14, 1924.

C. DE MATTIA 1,511,556

BRAKE CONTROLLING MECHANISM FOR TRAILERS

Filed Jan. 23, 1922

Patented Oct. 14, 1924.

1,511,556

UNITED STATES PATENT OFFICE.

CONSTANT DE MATTIA, OF DETROIT, MICHIGAN, ASSIGNOR TO WOLVERINE TRAILER EQUIPMENT COMPANY, OF DETROIT, MICHIGAN, A CORPORATION OF MICHIGAN.

BRAKE-CONTROLLING MECHANISM FOR TRAILERS.

Application filed January 23, 1922. Serial No. 531,149.

*To all whom it may concern:*

Be it known that I, CONSTANT DE MATTIA, citizen of the United States, residing at Detroit, county of Wayne, State of Michigan, have invented a certain new and useful Improvement in Brake-Controlling Mechanism for Trailers, and declare the following to be a full, clear, and exact description of the same, such as will enable others skilled in the art to which it pertains to make and use the same, reference being had to the accompanying drawings, which form a part of this specification.

My invention relates to a brake controlling mechanism for trailers for motor driven vehicles shown in the accompanying drawings and more particularly described in the following specification and claims.

One of the objects of this invention is to provide means for automatically applying the brake mechanism of a trailer immediately upon the application of the brake mechanism of the truck or motor hauling vehicle, to which the trailer is coupled, should the hauling vehicle suddenly stop or slow down in transit and also to maintain the trailer under control when descending a grade;—the construction however being such that the braking mechanism of the trailer is automatically released upon the acceleration of the hauling vehicle when ascending a hill or upon the driver of the hauling vehicle increasing its speed while under his control.

A further object of the invention is to provide for automatically setting the brake of the trailer upon the hauling vehicle backing toward it in order that the tractor and trailer may be readily coupled together.

A further object of the invention is to provide means whereby both the hauling vehicle and the trailer may be backed without setting the brake mechanism of the trailer.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a fragmentary side elevation of a motor driven vehicle indicated by dot and dash lines,—also a fragmentary view of a trailer coupled to the tractor, showing in full lines a manually operated lever mechanism controlled by the driver whereby the brake mechanism of the trailer may remain in released position, in order that the tractor and trailer may be backed together without setting the brakes of the latter, the view showing in dash lines the lever mechanism of the hauling vehicle raised to prevent any relative movement of the latter vehicle with the trailer whereby the brake mechanism may be actuated.

Figure 2:
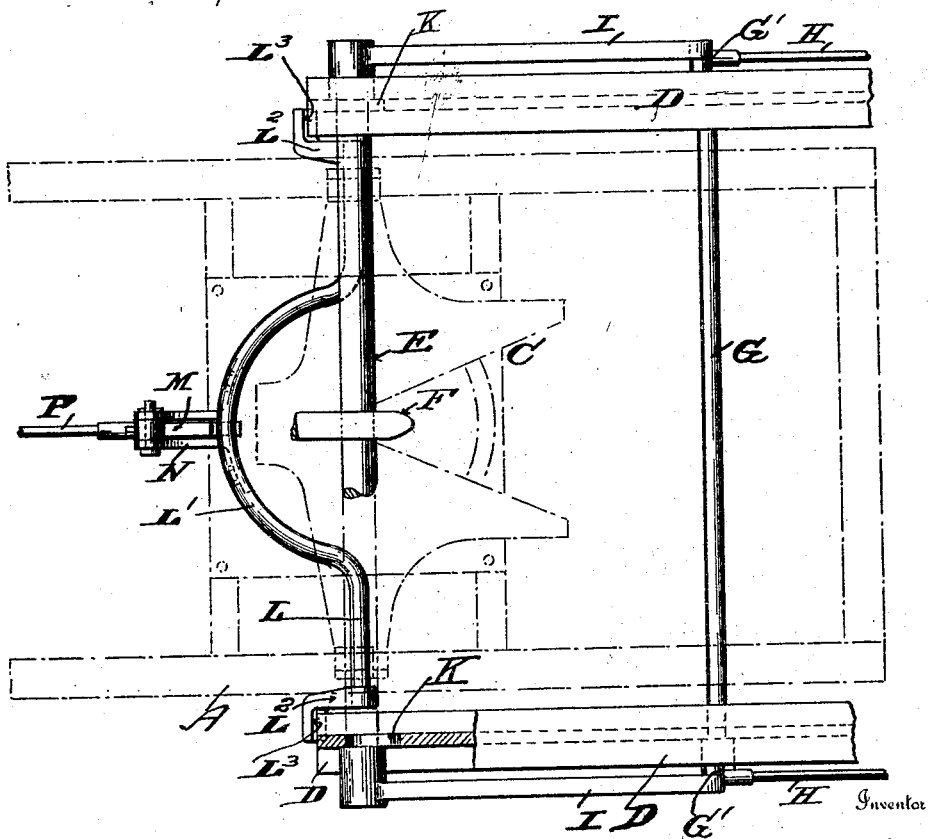

Figure 2 is a fragmentary plan view with parts in section showing the tractor in dot and dash lines coupled to the trailer with the lever mechanism of the trailer raised to maintain its brake mechanism in released position.

Referring now to the letters of reference placed upon the drawings:

A, denotes the frame of a motor driven or hauling vehicle; B, the driver's seat; C, the usual fifth wheel mechanism carried by the hauling vehicle; D, indicates the frame of the trailer; E, designates a floating transverse coupling bar supported in the side members of the trailer frame adapted for engagement by a hook F, supported above the fifth wheel of the tractor. G, is a rock-shaft journaled in the side sills of the trailer frame D, fitted at each end with rocker arms G' G', to which are connected brake rods H, H, controlling the usual brake mechanism (not shown) carried upon the wheel hubs of the trailer. I, I, denote link bars respectively connected to the rocker arms G' and to the ends of the floating transverse coupling bar E, which has a limited slidable movement in the slotted ways K, K, provided in the side members of the trailer frame D. L, indicates a rock-shaft journaled in suitable bearings secured to the tractor frame. The rock-shaft L is formed with an arc-shaped central portion L' partially encircling the fifth wheel mechanism whereby it may be free to rock without interfering with the latter. Fitted to the ends of the rock-shaft L, are right angle members $L^2$ adapted to overlap the ends of the trailer frame D to provide an abutment L³ to receive the thrust of the trailer frame when the tractor is backed into the trailer. The rock-shaft L is actuated by a bell-crank lever M, pivoted in a bracket N,—in turn bolted to the supporting frame of the fifth wheel mechanism of the tractor. P, is a connecting rod pivoted at one end to the bell-crank lever and at its opposite end to a manually operated lever Q installed in the cab of the tractor conveniently near the driver's seat.

Having now indicated the several parts by reference letters the construction and operation of the device will be readily understood.

The tractor having been coupled with the trailer should the speed of the tractor be suddenly retarded the trailer moving toward the tractor at a relatively higher speed than the latter will serve to operate the rock shaft G through the thrust of the links I, mounted upon the floating transverse shaft E, in turn engaged by the hook F of the tractor. The rock shaft G will thus be tilted thereby operating the brake mechanism of the trailer. Upon the tractor being driven the hook F engaging the floating transverse bar E will through its movement in the slots K, K, of the trailer, serve to reverse the tilting movement of the rock shaft G, thereby releasing the brake mechanism of the trailer. So also upon backing the tractor into the trailer to couple the vehicles together by means of the hook F which engages the floating transverse bar E the links I, I, acting upon the rocker arms G' G' of the rock-shaft will also operate the brake mechanism of the trailer so that the trailer may be held while the coupling of the tractor with the trailer is effected.

If however it is desired to back both the tractor and trailer the driver may upon manually operating the lever Q cause the bell crank lever M to lift the rock-shaft L, thereby shifting the position of the right angle members L² into the path of the side sills of the trailer frame D. It will now be evident that the ends of the trailer frame D, upon contacting with the abutting portion L³ of said members L², will serve to prevent a relative movement of the trailer frame toward the tractor sufficient to cause the operation of the trailer brake mechanism.

In order that certain parts may be more clearly shown in the drawings the side sill of the trailer frame is broken away on the underside at its ends, as indicated at d in Figure 1 of the drawings:—In practice however the end of the frame is cut square to engage the angular member L² as will be readily understood. The floating transverse coupling bar E carried by the trailer,— upon which the link-bars I, I, are mounted,—is shown in Figure 2 partly in dot and dash lines that it may not be confused with the rock-shaft L located directly beneath said transverse coupling bar.

Having thus described my invention what I claim is:

1. The combination of a hauling vehicle, a trailer, a suitable braking mechanism for the trailer, combined coupling and brake applying mechanism including means for detachably connecting the trailer with the hauling vehicle for automatically applying the brake mechanism of the trailer through the thrust of the hauling vehicle resulting from a difference in the relative movement of the respective vehicle, and means carried by the hauling vehicle and arranged to receive the thrust of the trailer for preventing operation of the brake applying mechanism.

2. The combination of a hauling vehicle, a trailer, a suitable braking mechanism for the trailer and combined means for coupling the trailer to the hauling vehicle and for operating the braking mechanism, including means for detachably connecting the trailer with the hauling vehicle and for automatically applying the brake mechanism of the trailer through the thrust of the hauling vehicle resulting from a difference in the relative movement of the respective vehicle, means carried by the hauling vehicle and arranged to receive the thrust of the trailer for preventing operation of the brake mechanism, and manually operable means for throwing the thrust receiving mechanism into and out of operation.

3. The combination of a hauling vehicle, a trailer and suitable braking mechanism for the trailer, combined means for coupling the trailer to the hauling vehicle and for operating the braking mechanism including means for detachably connecting the trailer with the hauling vehicle and for automatically applying the brake mechanism of the trailer through the thrust of the hauling vehicle, mechanism mounted on the hauling vehicle and arranged to receive the thrust of the trailer for preventing operation of the brake mechanism of the trailer and means also mounted on the hauling vehicle and including a hand lever for throwing the thrust receiving mechanism into and out of operation.

4. The combination of a hauling vehicle, a trailer, means for detachably connecting the hauling vehicle and trailer together including a floating transverse bar supported in the frame of the trailer having a limited slidable movement therein, a hook member carried by the hauling vehicle adapted to automatically engage the floating transverse bar, a rock-shaft journaled in the frame of the trailer, a brake operating mechanism for the trailer, means connecting the rock-shaft with the brake operating mechanism of the trailer, link connections between the rock-shaft and said floating transverse bar, whereby upon the movement of the floating transverse bar as a result of the thrust of the trailer due to difference in the speed of the respective vehicles said rock-shaft may be actuated to set the brake mechanism, and manually operated means carried by the hauling vehicle adapted to act as an abutment to receive the thrust of the trailer frame, whereby the brake mechanism of the trailer may be maintained in released position to permit simultaneous backing of the hauling vehicle and trailer.

5. In a tractor machine, a tractor and trailer having brake operating mechanism, means for detachably connecting the trailer with the tractor including a floating transverse bar having a limited sliding movement through slotted ways in the trailer frame, a coupling hook carried by the tractor and arranged to engage the said floating transverse bar, a rock shaft journaled in a trailer frame and connected with the brake operating mechanism, a link connection between the rock-shaft and the floating transverse bar, whereby upon the operation of the rock shaft through the floating bar and the link mechanism, brake mechanism of the trailer may be set and a swinging abutment carried by the tractor, manually operated means for swinging said abutment into position to receive the thrust of the trailer frame to hold the floating transverse bar against sliding movement in the said slotted ways to enable the tractor and trailer to be simultaneously backed without operating the brake mechanism of the latter.

In testimony whereof, I sign this specification in the presence of two witnesses.

CONSTANT DE MATTIA.

Witnesses:
S. E. THOMAS,
JOHN CONSIDINE.